[54] PULSE RADAR APPARATUS

[75] Inventors: Herman Michel Van Hijfte; Jan Dirk Ehbel, both of Hengelo, Netherlands

[73] Assignee: Hollandse Signaalapparaten B.V., Hengelo (O), Netherlands

[22] Filed: Apr. 17, 1973

[21] Appl. No.: 351,838

[30] Foreign Application Priority Data
Apr. 25, 1972  Netherlands........................ 7205560

[52] U.S. Cl........... 343/7 A, 343/5 DP, 343/17.1 R, 343/17.1 PF
[51] Int. Cl............................ G01s 9/02, G01s 7/30
[58] Field of Search....... 343/17.1 R, 17.1 PF, 5 DP

[56] References Cited
UNITED STATES PATENTS
| | | | |
|---|---|---|---|
| 3,258,769 | 6/1966 | Forestier...................... | 343/17.1 PF |
| 3,491,360 | 1/1970 | Stoorvogel..................... | 343/17.1 R |
| 3,514,707 | 5/1970 | Campanaro et al........ | 343/17.1 R X |

*Primary Examiner*—Malcolm F. Hubler
*Attorney, Agent, or Firm*—Frank R. Trifari

[57] ABSTRACT

Pulse radar apparatus capable to generate cyclically a train of transmitter pulses with interpulse periods $T_1$, $T_2$, $T_1 + \Delta T$ and $T_2 + \Delta T$.

This apparatus comprises successively a receiver, a digital double canceller with a periodic shift time equalling the smallest interpulse period, a digital-to-analogue converter, a standard-pulse generator, a digital delay-line integrator with said periodic shift time, two parallel-connected branches meeting at a gate circuit, one branch comprising, successively, a first comparator and a correlator, and the other branch a second comparator and a delay element with a delay time of $\Delta T$.

The threshold level of the first comparator is maximally equal to that of the second comparator.

On the receipt of each two sequential video signals with an interval $\Delta T$ the correlator causes that the gate circuit blocks the access to a PPI for the corresponding video signals supplied via the delay element.

6 Claims, 26 Drawing Figures

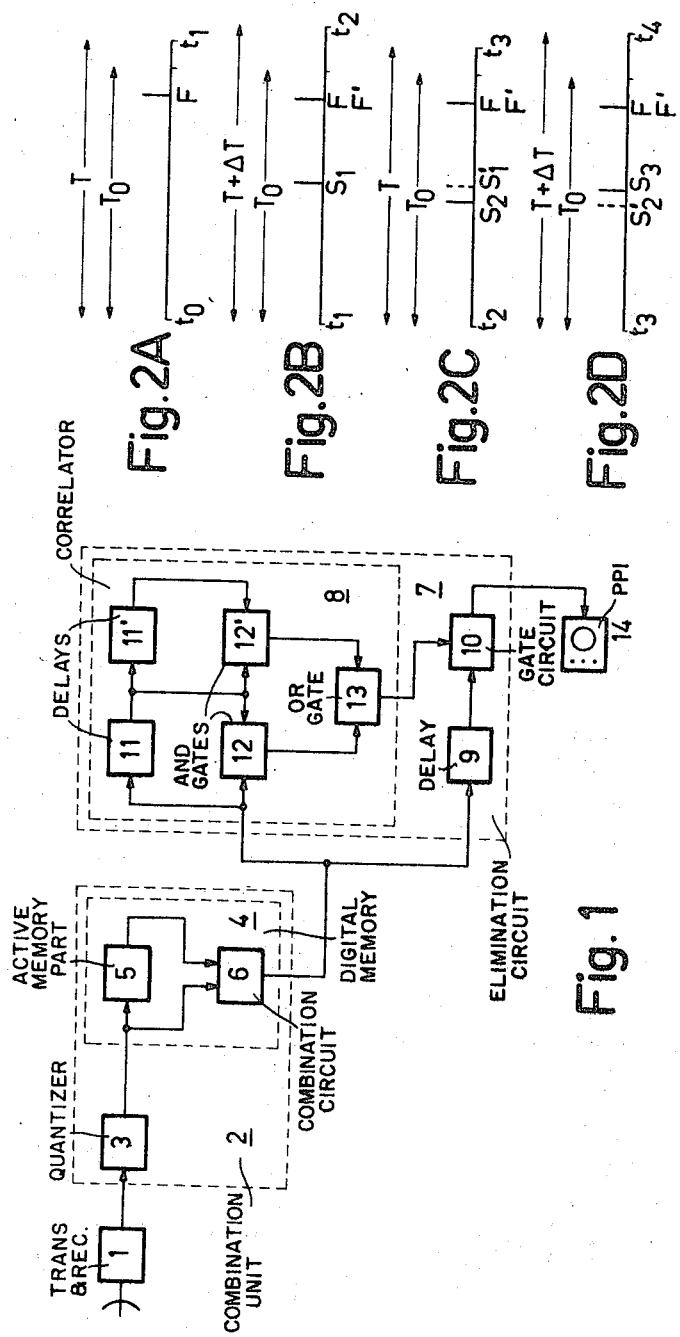

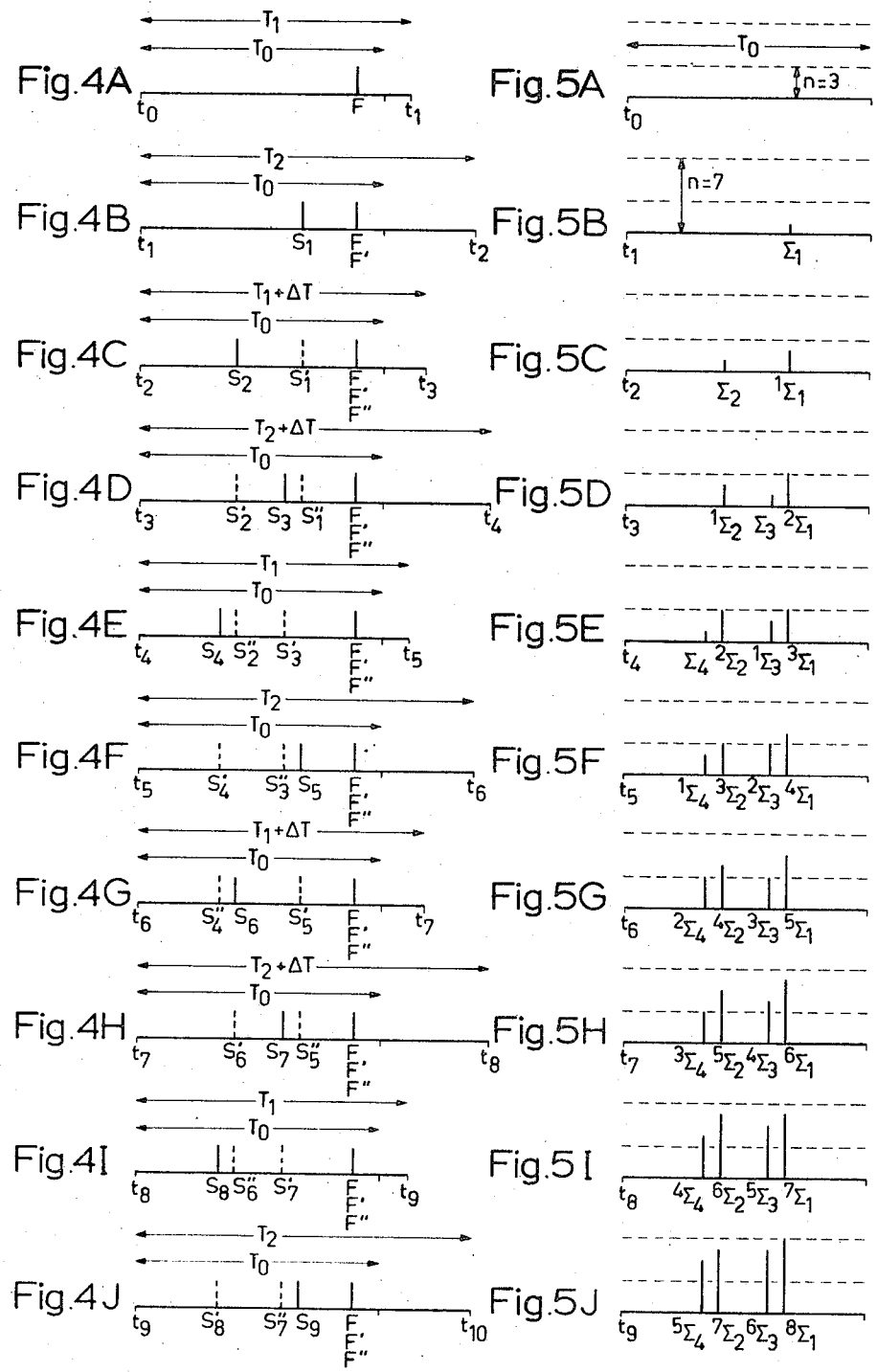

PULSE RADAR APPARATUS

The present invention relates to a pulse radar apparatus, comprising a transmitter capable to generate a train of transmitter pulse with at least a double stagger of interpulse periods, a receiver, and means with the aid of which video signals of multiple time-around target echoes are eliminated from a plan position indicator (PPI).

Such a radar apparatus is known from the U.S. Pat. No. 3,491,360, which describes the generation of transmitter pulses of which the staggered interpulse periods are T and T + ΔT. By the use of an interference suppression unit, video signals of second time-around echoes are eliminated. For this purpose the interference suppression unit is provided with a delay circuit and a gate circuit, to which the receiver-supplied video signals are fed directly and via said delay circuit, while the gate circuit passes a directly supplied signal only if a delayed signal is applied simultaneously. The interference suppression unit is designed in such a way that the delay introduced by the delay circuit assumes the values T and T + ΔT alternately, so that only the sequential first-time-around echoes coincide in the gate circuit and are therefore passed.

Generally, in a pulse radar apparatus, as described in said U.S. patent, the interference suppression unit passes the (2n + 1)th-time-around echoes (n = 0, 1, 2, ... J of the multiple-time-around target echoes present; for such video signals are detected in an interval corresponding with an interpulse period and commencing after a time equal to the duration of 2n sequential interpulse periods, i.e. n(2T + ΔT), has elapsed. Therefore, the difference between the moment at which such an echo signal, originating from the same target, is detected and the moment at which the last transmitter pulse is generated, is constant. This difference also holds in the interference suppression unit, thus realizing the coincidence of such video signals in the gate circuit.

However, of the multiple time-around target echoes the (2n + 2)th-time-around echoes are not passed by the interference suppression unit, since these signals are detected in an interval corresponding with an interpulse period and commencing after a period of time, equal to the duration of (2n + 1) sequential interpulse periods, has elapsed; for this is alternately equal to n(2T + ΔT) + T and to n(2T + ΔT) + (T + ΔT), so that the difference between the time at which such an echo signal, originating from the same target, is detected and the time at which the last transmitter pulse was generated is alternating.

A radar apparatus, as described above, also has the disadvantage that it cannot be adapted to suppress clutter signals. It is desirable that, for the purpose of clutter signal suppression, a pulse radar apparatus has a provision so as to compare two sequential video signals originating from the same target. Such a provision comprises a delay element of which the delay time is equal to the interpulse period. Thus the combination of a clutter suppression unit, containing such a delay element, with the above-mentioned interference suppression unit, also containing a delay element, produces at least a replica of each video signal, which replica is retarded over a time duration equal to two successive interpulse periods, viz. (2T + ΔT). Hence, coincidence continually occurs in the gate circuit, so that this circuit will pass each video signal directly supplied. It is therefore an object of the present invention to provide a radar apparatus of the kind set forth in the opening paragraph, which radar apparatus lends itself easily for the incorporation of a provision for the suppression of clutter signals on a PPI, and to apply such a provision usually in a radar apparatus as described above.

In accordance with the present invention, the means, which are part of the pulse radar apparatus and used to exclude video signals of multiple time-around target echoes from a PPI, comprise at least a (first) combination of a quantizer and a digital memory, and also an elimination circuit, the digital memory containing at least one active memory part and a combination circuit, which is fed, directly as well as via said memory part, with the sequential video signals supplied via the quantizer, whereby the memory part is operative only for a fixed duration, which starts from the moment a transmitter pulse is generated and which is maximally equal to the smallest interpulse period employed, and which memory part imposes upon each quantized video signal supplied, in addition to a delay corresponding with said fixed duration, a delay which is due to an inoperative state of said memory part, said state occurring during said fixed duration, and whereby the elimination circuit is provided with a delay element, a correlator and a gate circuit, where the video signals, being fed from the digital memory to the elimination circuit, are applied to the delay element and also to the correlator which, on the receipt of each two video signals succeeding each other with an interval equal to the smallest possible time difference between the interpulse periods employed, causes that the gate circuit blocks the access to the PPI for the corresponding video signals supplied via the delay element.

It is often desirable that video signals originating from asynchronous clutter signals and also video signals regarded alternately as first-time-around or second-time-around signals due to the staggered interpulse periods, be suppressed. Therefore, the pulse radar apparatus, in accordance with the present invention, may be employed to advantage if the digital memory is used as a delay line integrator containing a number of series-connected active memory parts of the kind already described and if two comparators, to which said correlator and the delay element are connected separately, are inserted between the digital memory and the elimination circuit, whereby the comparator connected to the correlator has a threshold which is maximally equal to the threshold of the comparator connected to the delay element, and whereby the quantizer generates a standardized video pulse for each applied video signal exceeding a certain threshold, said video pulse being fed, directly and also with a delay imposed by the least one of the memory parts of the delay line integrator, to the corresponding combination circuit, the output signal of which being applied to the two comparators. In order to prevent the passage of the first-time-around echoes, originating from all kinds of clutter signals to the PPI, another second combination, also consisting of a quantizer and a digital memory and being inserted between the receiver and said first combination may effectively be employed in the pulse radar apparatus, in which the quantizer is used as an analogue-to-digital converter and the digital memory as a double canceller, and the first combination is coupled to the double canceller, and the first combination is coupled to the second combination by means of a digital-to-analogue converter.

The present invention and its advantages will now be described in more detail with reference to the accompanying drawings, in which:

FIG. 1 illustrates a block diagram of a pulse radar apparatus in accordance with the principle of the present invention;

FIGS. 2A – 2D illustrate some diagrams indicating the principle of the present invention;

Figure 3:
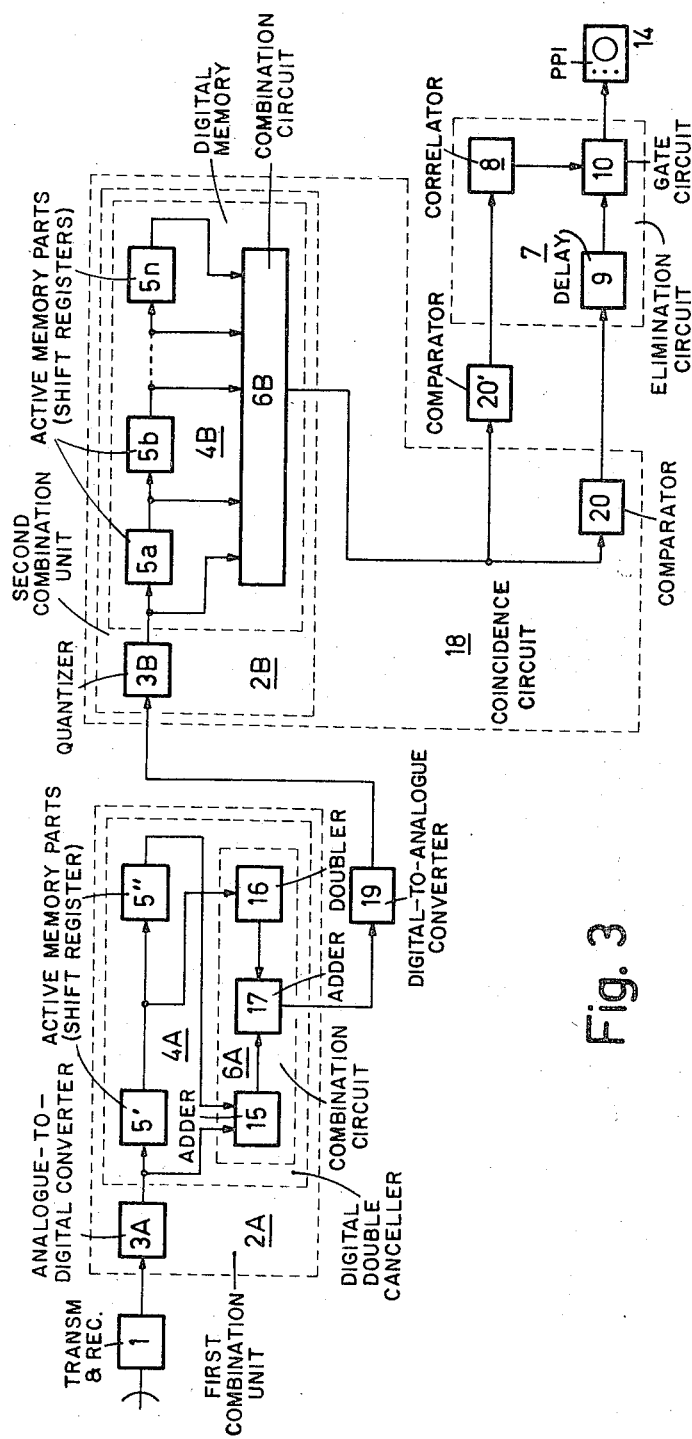
FIG. 3 illustrates an embodiment of a pulse radar apparatus in accordance with the present invention, while FIGS. 4A – 4J, 5A – 5J contain diagrams for further explanation of said embodiment.

FIG. 1 illustrates a pulse radar apparatus which is provided with a transmitter and receiver unit 1. To simplify the description of the suppression of multiple-time-around echoes, the transmitter is assumed to be able to generate transmitter pulses with two interpulse periods T and T + $\Delta$T. The difference $\Delta$T between these times, also called wobble time, is greater than the duration of a transmitter pulse.

In the description of said radar apparatus, reference will be made to FIGS. 2A – 2D, illustrating the processing method of the video signals produced in the pulse radar apparatus. In these figures $t_0$, $t_1$, etc. represent the times at which the transmitter generates the train of transmitter pulses. The echo signals obtained from one transmitter pulse may be divided into first-time-around echoes (F), which are detected by the radar apparatus within the interpulse period commencing with are detected after this interpulse period. In addition to first-time-around echoes (F), FIGS. 2A – 2D also indicate second-time-around echoes (S) detected within an interpulse period that commences at the moment of generation of the transmitter pulse which succeeds the transmitter pulse causing the second-time-around echo.

FIGS. 2A – 2D show that the video signals of the first-time-around echoes, briefly called FT signals, occupy the same position on the time axis, with respect to the times $t$, $t_1$, ..., in each of the successive interpulse periods. The position on the time axis from the moment of detection of an echo signal, with respect to the moment of the last-generated transmitter pulse, will be denoted by "position on the time axis". Due to the varying magnitude of the interpulse periods, the video signals of the second-time-around echoes, hereinafter called ST signals, occupy alternate positions on the time axis in the successive periods.

From FIGS. 2A – 2D it may be seen that, in the case of detection of second-time-around echoes occurring in an interpulse period T, such as e.g., $S_2$ in FIG. 2C, the position of these echoes on the time axis, with respect to the moment at which such a period commences, shows a time difference $\Delta$T with the positions of second-time-around echoes on the time axis which echoes are detected in an interpulse period T + $\Delta$T, such as e.g. $S_1$ in FIG. 2B. By comparing the positions of two corresponding video signals, detected in successive interpulse periods, it can be determined whether a video signal is to be regarded as an FT signal. For this purpose, the pulse radar apparatus is provided with a unit 2, formed by the combination of a quantizer 3 and a digital memory 4. With the aid of said quantizer, for which an analogue-to-digital converter or a standard pulse generator can be employed, the video signals demodulated by the receiver are delivered in quantized form to the digital memory 4. The memory 4 contains an active memory part 5 and a combination circuit 6, the active memory part 5 accommodating a supplied video signal and delivering this signal at the same position on the time axis in the following interpulse period. In the combination circuit 6, for which an OR circuit may be used, both a video signal supplied directly by the quantizer and the video signal delayed by the memory part 5 are combined. For the active memory part 5 it is preferred to use a shift register with a shift time $T_0$, which is maximally equal to the smallest interpulse period employed, the shift register being operative during the shift time $T_0$, each time from the moment of generation of a transmitter pulse. Provided the quantized video signal is still in the memory part, this signal remains at its assumed memory location during the inoperative period, whereupon it is shifted along in the next interpulse period and then delivered. This is for example the case if an echo signal is detected in the interpulse period T + $\Delta$T, while the shift time $T_0$ of the memory part is less than or equal to T. Up to the end of the shift time $T_0$, which may, for example, still take a time $t'$, the quantized video signal is shifted in the memory part 5. During the subsequent time T + $\Delta$T − $T_0$ the memory part 5 is inoperative, and the quantized video signal remains at its assumed memory location. Thereupon, the quantized video signal is shifted along in the memory part 5, still taking up a time of $T_0 − t'$. Thus the total delay time of such a signal is $t' + (T + \Delta T − T_0) + (T_0 − T') = T + \Delta T$, which is equal to the duration of the period in which the echo was detected. In this way it is obtained that for each video signal detected in a certain interpulse period a replica, occupying the same position on the time axis, is supplied in the subsequent interpulse period; this replica is indicated by F' and S', respectively, in FIGS. 2A – 2D. An analogous remark may be applied to an echo signal detected in an interpulse period T, where the shift time $T_0$ is less than T.

As may be seen from FIG. 2C, in an interpulse period the positions of a delayed ST signal $S_1'$ and a corresponding undelayed ST signal $S_2'$ differ by a time duration $\Delta$T, while a delayed FT signal (F') and an undelayed FT signal (F) coincides at each instance. This characteristic difference is the basis of the selection between the FT signals and the ST signals. Accordingly, an elimination circuit 7 is inserted behind the combination 2. The only purpose of this elimination circuit is to admit only the FT signals to the PPI 14. To this effect the elimination circuit 7 is provided with a correlator 8, a delay element 9 and a gate circuit 10; the signals being fed to the elimination circuit 7 are applied to the correlator 8 and the delay element 9. The correlator 8 is so designed that, on the receipt of each two video signals succeeding each other with an interval of $\Delta$T, it causes the gate circuit 10 to block the access to the PPI 14 for the corresponding video signals supplied via the delay element 9.

The correlator 8 and hence the gate circuit 10 become operative for a short duration only if the last of each two video signals, having a mutual positional difference of $\Delta$T on the time axis, is applied to the correlator 8. Therefore, the corresponding signals supplied directly to the gate circuit 10 must also be delayed a time $\Delta$T with the aid of delay element 9.

In the embodiment in question the correlator 8 is provided with two series-connected delay elements 11 and 11', each with a delay time of $\Delta T$, while each of these delay elements are bridged separately by an AND gate 12 and 12' respectively. Upon the supply of two successive video signals having a mutual positional difference of $\Delta T$ on the time axis, to the first delay element 11, the AND gate 12 will be activated at the moment the last of these two video signals is applied. The AND gate 12 controls in turn the gate circuit 10 via an OR gate 13, thus achieving that the access to the PPI 14 is blocked for the first of the two corresponding video signals applied via delay element 9. After a time $\Delta T$, the two video signals activate the second AND gate 12', the output signal of which controls in turn the gate circuit 10 via the common OR gate 13. This causes the access to the PPI 14 to be blocked for the last of the two corresponding signals applied via the delay element 9. However, the positions of the FT signals coincide at each instance, so that the AND gates 12 and 12' respectively, are not activated upon the supply of these signals; therefore, the corresponding FT signals, supplied to the gate circuit 10 via the delay element 9, are admitted to the PPI 14.

The detection period of the third-time-around video signals, briefly called TT signals, commences at the moment when the second transmitter pulse is generated after the transmitter pulse producing the TT signal. The position of a TT signal on the time axis is obtained by decreasing the travel time of the echo by two successive interpulse periods, i.e., by the constant amount of $2T + \Delta T$. Hence, the TT signals have no positional difference $\Delta T$ on the time axis, and are not suppressed.

The position of fourth-time-around signals, of which the detection period commences at the moment of generation of the third transmitter pulse that follows the transmitter pulse producing the fourth-time-around signal, is obtained by decreasing the travel time $t$ of the echo by three successive interpulse periods. The position of such a fourth-time-around signal on the time axis thus corresponds with the time $t - T - (T + \Delta T) - T = t - 3T - \Delta T$, or with the time $t - (T + \Delta T) - T - (T + \Delta T) = t - 3T - 2\Delta T$. Consequently, the fourth-time-around, signals, just like the second-time-around signals, show alternate positions on the time axis with a mutual difference of $\Delta T$, so that these signals will be suppressed. In general, when using such a pulse radar apparatus, a $(2n + 1)$th-time-around echo ($n = 0, 1, 2, \ldots$), of which the position is obtained by decreasing the travel time by $n(2T + \Delta T)$, cannot be suppressed, whereas this can be done so in the case of $2n$ th-time-around echoes whose position is obtained by decreasing the travel time by $(n - 1) T + n(T + \Delta T)$, or by $nT + (n - 1)(T + \Delta T)$.

A radar apparatus, as hitherto described, is particularly suitable for the generation of successive transmitter pulses with a multiple stagger of interpulse periods which, however, should be so arranged that they form a finite arithmetic series with common difference $\Delta T$ ($T, T + \Delta T, \ldots, T + k\Delta T$, where $k$ is an integer). It is not possible however to provide such a pulse radar apparatus with a double canceller for the elimination of blind speeds; for a double canceller is useful only if the pulse radar apparatus generates transmitter pulses with at least two interpulse periods, which show a much greater time difference than the wobble time $\Delta T$.

As shown in FIG. 3, an optimum and, in all respects, advantageous pulse radar apparatus is obtained if the apparatus according to the present invention is at least provided with two units 2A and 2B, each of which being formed by a combination of a quantizer and a digital memory, which combinations are of the same kind as the unit 2 illustrated in FIG. 1. If, in this embodiment, parts of the radar apparatus are not further discussed, the description applying to these parts is analogous to that given for the pulse radar apparatus shown in FIG. 1. In the description of the radar apparatus indicated in FIG. 3 reference is made to the diagrams given in FIGS. 4A – 4J, 5A – 5J. The diagrams shown in FIGS. 4A – 4J refer to signals delivered by the unit 2A, while those given in FIGS. 5A – 5J refer to signals supplied by the unit 2B. The pulse radar apparatus illustrated in FIG. 3 is provided with a transmitter and receiver unit 1, the transmitter being suitable for the generation of successive transmitter pulses preferably with four stagger interpulse periods. These interpulse periods are here denoted by $T_1$, $T_1 + \Delta T$, $T_2$ and $T_2 + \Delta T$, where $\Delta T$ as in the case of the pulse radar apparatus shown in FIG. 1, is equal to the wobble time. The difference between $T_1$ and $T_2$, also called stagger time, is small compared with the interpulse period $T$, but is large compared with the wobble time $\Delta T$. The sequence of these times is important, as will be shown later.

The video signals demodulated with the aid of the receiver are fed to the unit 2A. This unit is provided with an analogue-to-digital converter 3A and a digital double canceller 4A. The phase-sensitive demodulated video signals are digitized in the analogue-to-digital converter, whereupon the signals thus obtained are applied to the double canceller 4A. This canceller comprises two active memory parts 5' and 5'', connected in series, which are of the same kind as those applied in the pulse radar apparatus shown in FIG. 1. Such an active memory part is therefore characterized by the shift time $T_0$, which is less than or equal to the smallest interpulse period employed, and the delay time, equal to the interpulse period in which the video signal to be delayed was detected. The digital double canceller 4A is provided with a combination circuit 6A, containing an adder 15, a doubler 16 and an adder 17. The signals digitized by the analogue-to-digital converter 3A are fed to the first shift register 5' and to the adder 15. These signals are delayed in the shift register 5' and then fed to the second shift register 5'' and the doubler 16. The doubler 16 doubles the value of each supplied digitized signal and then inverts this value. A signal delayed by the second shift register 5'' is fed to the adder 15, where this signal and a signal delivered simultaneously by the analogue-to-digital converter 3A are added.

The behavior of the double canceller 4A will be discussed, especially for the case that the pulse radar apparatus is suitable for the generation of transmitter pulses with the four-stagger interpulse periods. In this discussion only FT signals will be dealt with; this is permissible, as will be explained later. The signal derived from the adder 15 together with the signal originating from the doubler 16 are combined in the adder 17 to a function:

$$F = f(T_A, O, t) + f(T_C, T_A + T_B, t) - 2f(T_B, T_A, t),$$

where the function values $f(T_A, O, t)$, $f(T_C, T_A + T_B, t)$ and $f(T_B,T_A,t)$ correspond with the output voltages simultaneously obtained from the second memory part 5'', the first memory part 5' and the analogue-to-digital converter 3, respectively. The above functions represent phase-sensitive demodulated video signals and are accordingly defined by the following relationship:

$$f(T_P,T_R,t) = k \sin[\omega_D(t + T_P + T_R) - \phi_0]$$

where $T_P$ represents the interpulse period within which the relevant echo signal is detected, $T_R$ represents the time duration between an instant chosen for each function F separately and the instant of generation of the transmitter pulse producing the echo signal, $t$ is the travel time of the echo signal, $k$ the amplitude, $\omega_D$ the doppler angle frequency and $\phi_0$ a phase constant. The above function F may be written as $$F = [f(T_A,0,t) - f(T_B,T_A,t)] + [f(T_C,T_A + T_B,t) - f(T_B,T_A,t)].$$

Depending on the selection of the three successive interpulse periods, function F can assume the following four forms:

$F_1 \equiv [f(T_1,0,t) - f(T_2,T_1,t)] + [f(T_1+\Delta T, T_1+T_2,t) - f(T_2,T_1,t)]$ $F_2 \equiv [f(T_2,0,t) - f(T_1+\Delta T,T_2,t)] + [f(T_2+\Delta T, T_1+T_2+\Delta T,t) - f(T_1+\Delta T,T_2,t)]$ $F_3 \equiv [f(T_1+\Delta T,0,t) - f(T_2+\Delta_{T,T_1}+\Delta T,t)] + [f(T_1,T_1+T_2+2\Delta T,t) - f(T_2+\Delta T, T_1+\Delta T,t)]$ $F_4 \equiv [f(T_2+\Delta T,0,t) - f(T_1,T_2+\Delta T,t)] + [(f(T_2,T_1+T_2+\Delta T,t) - f(T_1,T_2+\Delta T,t)]$ However, these four functions $F_1 - F_4$ do not differ in behaviour mutually; for function $F_2$ is obtained by substituting $T_2$ for $T_1$ and $T_1 + \Delta T$ for $T_2$ in function $F_1$. Function $F_3$ is obtained from function $F_1$ by substituting $T_2 + \Delta T$, for $T_2$, and function $F_4$ by substituting $T_2$ for $T_1$ and $T_1$ for $T_2$, taking into account however, the commutative rule $f(T_A,T_B,t) = f(T_B,T_A,t) = f(T_A + T_B,0,t)$ and also the requirement that all phase constants $\phi_0$ appearing in the same function $F$ should have the same value. The amplitude of the first part of function $F_1$, viz.: $[f(T_1,0,t) - f(T_2,T_1,t)]$ is equal to:

$$2k \sin \omega_D T_2/2,$$

while the amplitude of the second part, viz.: $[f(T_1+\Delta T,T_1+T_2,0) - f(T_2,T_1,t)]$ is equal to:

$$2k \sin \omega_D(T_1 + \Delta T)/2.$$

From this it is seen that with suitably selected interpulse periods $T_2$ and $T_1 + \Delta T$, the number of blind speeds in such a pulse radar apparatus is considerably reduced. The remaining three functions $F_2$, $F_3$ and $F_4$, have practically the same amplitudes, since the introduced substitutions will almost cause no change in the values of the respective trigonometric functions.

The output signals of the double canceller 4A as shown in FIGS. 4A – 4J, refer also in this case to FT signals (F) and ST signals (S) only. The FT signals, irrespective of the fact whether they are delayed by one or both of the memory parts 5' and 5'', always assume the same position on the time axis. However, the ST signals (S) and the relevant replicas (S' and S'') always have different positions on the time axis due to the varying interpulse periods, as may be seen in FIG. 4D, indicating the undelayed signal $S_3$, the singly delayed signal $S_2'$ and the double-delayed signal $S_1''$. FIG. 4E shows that no signal is available at the position which was taken on the time axis by signal $S_1''$ in FIG. 4D. However, in FIG. 4E the positions on the time axis, as were occupied by signals $S_2'$ and $S_3$ in FIG. 4D, are taken respectively by the delayed signals $S_2''$ and $S_3'$ corresponding with signals $S_2'$ and $S_3$. Also an undelayed signal $S_4$ is shown in FIG. 4E. Furthermore, FIGS. 4D and 4E indicate that only the signals $S_3$, $S_1''$ and signals $S_4$, $S_2''$ respectively occupy positions on the time axis showing a mutual difference $\Delta T$. Besides signals $S_2''$ and $S_3'$ on the time axis in FIGS. 4D and 4E respectively, there is no ST signal with which a positional difference $\Delta T$ can be formed on the time axis. Hence, the double canceller 4A is not the appropriate apparatus, to which an elimination circuit 7 can be connected, for the signals $S_2'$ and $S_3'$ mentioned above are not suppressed in the elimination circuit 7. In the embodiment in question this problem is obviated by the inclusion of a coincidence circuit 18 between the unit 2A and the elimination circuit 7, the coincidence circuit 18 being connected to the unit 2A via a digital-to-analogue converter 19. The coincidence circuit 18 comprises the unit 2B, composed of a quantizer 3B and a digital memory 4B, and also a comparator 20 connected to the combination 2B. In the embodiment in question the quantizer 3B and the digital memory 4B are designed as a standard-pulse generator and a delay line integrator respectively. The standard-pulse generator 3B delivers a standard pulse to the delay line integrator 4B only if this generator receives a signal having an analogue value greater than a fixed threshold. The delay line integrator 4B contains a number of active series-connected memory parts $5a - 5n$, which are of the same kind as those applied in the digital memories 4 and 4A shown in FIGS. 1 and 3 respectively. It should however, be noted that in the embodiment in question a standard pulse is fed to the delay line integrator 4B, so that each active memory part comprises only one shift register. The double canceller 4A receives, however, digitized values, as this is necessary for the selection of Doppler-modulated video signals from the clutter signals, so that each of the active memory parts contained therein comprises several parallel-connected shift registers. The delay line integrator 4B also comprises a combination circuit 6B which is fed, in addition to a signal directly supplied by the standard pulse generator 3B, with the signals delayed by each of the active memory parts $5a - 5n$. Each time a signal is applied to the combination circuit 6B, the latter delivers a voltage pulse whose magnitude depends on the number of signals being supplied simultaneously at such an instance. The voltage pulses so obtained are shown in accordance with their amplitude in FIGS. 5A – 5J. Since the elimination circuit 7 is not activated by FT signals, these signals have been omitted in said figures for clarity sake.

Upon the supply of each digitized video signal, the double canceller 4A delivers successively the video signal itself together with two replicas in he sequential interpulse periods, thus increasing each time the magnitude of the signals $\Sigma_1$, $^1\Sigma_1$ and $^2\Sigma_1$ (shown respectively in FIGS. 5B, 5C and 5D) which are derived from the signals $S_1$ and from the respective replicas as the case may be (see FIGS. 4B – 4D), since only one standard pulse determined by the ST signal $S_1$ (see FIG. 4B) is supplied to the combination circuit 6B during the interpulse period shown in FIG. 5B. In the subsequent interpulse period shown in FIG. 5C the standard pulse derived from signal $S_1$ and supplied via the memory part 5a is applied, simultaneously with the standard pulse derived from replica $S_1'$, to the combination circuit 6B, so that signal $^1\Sigma_1$ (FIG. 5C) obtains a double value. Similarly, signal $^2\Sigma_1$ obtains a treble value during the next interpulse period (see FIG. 5D). Since in the interpulse period shown in FIG. 4E no signal having a position on the time axis similar to that of signal $S_1$ is available, the magnitude of signal $^3\Sigma_1$, shown in the corresponding FIG. 5E, does not increase.

The voltage pulses which are generated by the combination circuit 6B and fed to comparator 20, are also supplied to a comparator 20'. Comparator 20' is so designed that it delivers a voltage pulse only if it receives a signal having an amplitude that is three times or more that of signal $\Sigma_1$. Comparator 20 is, however, so designed that detection of video signals occurs at an optimum signal/noise ratio associated with a maximum suppression of multiple-time-around signals. In: "Modern Radar, Analysis, Evaluation and System Design," by R. S. Berkowitz, 1965, Wiley, N.Y., reference is made to a coincidence detector, which has a threshold at $n$ pulses by simultaneously weighting a maximum of K pulses. Using an optimum signal/noise ratio, the level of said threshold of such a coincidence detector, identical to that incorporated as unit 18 in FIG. 3, can be determined by means of the empirical formula $n \approx 1,5 \sqrt{K}$, where the false alarm rate is within the limits of $10^{-10}$ and $10^{-5}$, and the detection probability of the object is between 50 and 90 percent. The delay-line integrator 4B in the embodiment in question comprises 10 series-connected active memory parts $5a - 5n$, so that the threshold of the comparator 20, according to the above criterion, should be set to $1.5 \sqrt{10}$ pulses (i.e., 5 pulses) simultaneously supplied. Thus the comparator 20 will deliver a voltage pulse only if a signal having an amplitude of five times that of signal $\Sigma_1$ is applied. However, this threshold level for the embodiment in question is not suitable and may best be increased in view of pulse jamming. In addition, there is a reasonable chance that a noise signal and an ST signal, both having the same position on the time axis, are detected within the space of a few interpulse periods. In this case, he comparator 20 delivers a signal as soon as an interference signal and the two delayed replicas, together with an ST signal and the respective singly delayed replica, are applied to the delay line integrator 4B within a space of 10 successive interpulse periods, the duration of which corresponding to the maximum delay time of the delay-line integrator 4B. Although, in this case, the comparator 20' will also deliver a signal, this will not yet activate the correlator 8; therefore, after a time duration of $\Delta T$ another singal should be supplied to the comparator 20'. This occurs for the first time in the period indicated in FIG. 5F, where the amplitude of signals $^4\Sigma_1$ and $^2\Sigma_3$ is respectively four times and three times that of signal $\Sigma_1$. Due to the noise signal mentioned above, the amplitude of signal $^4\Sigma_1$ in FIG. 5F would not have been four times, but seven times that of signal $\Sigma_1$. Therefore, ST signals would have been passed to the PPI 14'. Considering the fact that the ST signals should be suppressed as much as possible and taking into account that in FIGS. 5A - 5J such as amplitude occurs for the first time in the period indicated in FIG. 5F, it can be concluded that the threshold level should not be set to $n = 5$ but to $n = 7$, this being indicated in each of the respective figures by the dashed line at the top. Nevertheless, it is possible that, if two noise signals and a subsequent ST signal, both having the same position on the time axis, are detected within a space of a few interpulse periods, the ST signal will be admitted to the PPI 14. However, the probability of this occurring is very small and this phenomenon may therefore be neglected. Raising the threshold level from $n = 5$ to $n = 7$ renders, according to Berkowitz, only a loss of a one-half dB in the signal/noise ratio and this may be regarded favourable. Besides, through increasing the threshold value, aperiodic interference signals can easily be eliminated, so that it is almost impossible that these pulses reach the PPI 14.

The question arisen whether the video signals derived from multiple-time-around echoes of higher order will indeed be passed to the PPI 14. The position of TT signals on the time axis is obtained by decreasing the travel time by a time equal to two successive interpulse periods. By taking this into account and considering the fact that for the activation of the correlator 8 again the detection of video signals will a positional difference of $\Delta T$ is required, the interpulse periods should be so arranged as to allow a time difference unequal to $\Delta T$ between each two successive interpulse periods. It is obvious that a TT signal having for example a position $t - T_1 - (T_1 - \Delta T)$ on the time axis cannot be suppressed, since this will never be accompanied with another TT signal of which the position on the time axis is shifted by $\Delta T$. Therefore, elimination of third-time-around echoes is possible only if the interpulse periods $T_1$, $T_2$, $T_1 + \Delta T$ and $T_2 + \Delta T$ are arranged in this sequence. The positions, which may be present on the time axis, are then characterised by: $t - T_1 - T_2, T - T_1 - T_2 - \Delta T$ and $t - T_1 - T_2 - 2\Delta T$; hence, the third-time-around signals can be suppressed on the PPI.

The position of fourth-time-around signals on the time axis is obtained by decreasing the travel time $t$ by three successive periods, e.g. $[T_1 + T_2 + (T_1 + \Delta T)]$, which is equal to a constant C, being the sum of the four interpulse periods decreased by the interpulse period not yet referred to, i.e. $T_2 + \Delta T$. The position on the time axis is then characterized by $t - C + (T_2 + \Delta T)$; this presents, as concerns the elimination of fourth-time-around signals, a case similar to that of the ST signals. Consequently, fourth-time-around signals may also be suppressed.

The positions of fifth-time-around signals is obtained by decreasing the travel time by four interpulse periods; this is equal to said constant C, so that the elimination circuit 7 functions as in the case of FT signals. Therefore, the fifth-time-around signals cannot be suppressed.

In a similar way, it can be demonstrated that in addition to the FT signals, the $(4n + 1)$th-time-around signals ($n = 1, 2, \ldots$) cannot be suppressed either, if at least the above-mentioned sequence of the four interpulse periods is employed. The fact that the $(4n + 1)$th signals cannot be suppressed on the PPI 14 is of no practical importance, since each echoes are usually very weak in comparison with first-time-around echoes.

It remains to be considered whether a pulse radar apparatus suitable for the generation of transmitter pulses with six or more different interpulse periods also offers favourable possibilities. In case the apparatus is suitable for the generation of transmitter pulses with six interpulse periods, these periods should be so selected as to enable the division of them in pairs, where each pair of interpulse periods shows a mutual difference of $\Delta T$, as this is of importance to the efficient operation of the correlation 8. Therefore, the applicability of the series of interpulse periods $t_1$, $T_2$, $T_3$, $T_1 + \Delta T$, $T_2 + \Delta T$ and $T_3 + \Delta T$ will be examined in the pulse radar apparatus.

It is evident that, with the application of said pulse radar apparatus, the FT signals are not suppressed.

The position of ST signals on the time axis is obtained by decreasing the travel time $t$ by one of said interpulse periods, so that it may well be that ST signals having a positional difference of $\Delta T$ on the time axis will be present and will therefore be suppressed on the PPI 14. It is, however, necessary that the delay line integrator 4B and the comparator 20 are optimally dimensioned, so that video signals are detected with a maximum suppression of second-time-around signals, associated with an optimum signal/noise ratio.

The position of TT signals is obtained by decreasing the travel time $t$ by two successive interpulse periods, while the interpulse periods should be so arranged as to allow with each signal another signal with a positional difference of $\Delta T$ on the time axis; this is of importance to an efficient operation of the correlator 8 for the purpose of suppressing the TT signals. Therefore, if the series of interpulse periods are started with e.g. $T_1$ and $T_2$, these series should be continued with $T_1 + \Delta T$ and not with $T_2 + \Delta T$, since in this case two successive signals cannot obtain a positional difference of $\Delta T$ on the time axis. For the same reason, these series of interpulse periods are continued successively with $T_2 + \Delta T$ and $T_1$. The series so obtained will then be: $T_1$, $T_2$, $T_1 + \Delta T$, $T_2 + \Delta T$, etc. From these series it follows that the addition of two deviating interpulse periods, such as $T_3$ and $T_3 + \Delta T$, has a negative influence on the efficiency of the correlator 8 for the suppression of third-time-around signals on the PPI 14. Irrespective of the way in which the series of interpulse periods are started, a third pair of deviating interpulse periods will always be left over, so that no adequate suppression of TT signals is obtained when transmitter pulses with six different interpulse periods are generated.

The position of fourth-time-around signals on the time axis is obtained by decreasing the travel time $t$ by three successive interpulse periods, where no two of these three periods may have a time difference of $\Delta T$, while the first and the last periods of each four successive interpulse periods must differ by a time of $\Delta T$, thus benefiting the efficiency of the correlator 8 for the suppression of fourth-time-around signals. Taking this into account, only the sequence of interpulse periods $T_1$, $T_2 + \Delta T$, $T_3$, $T_1 + \Delta T$, $T_2$, $T_3 + \Delta T$, $T_1$ etc. and the sequence $T_1$, $T_2$, $T_3$, $T_1 + \Delta T$, $T_2 + \Delta T$, $T_3 + \Delta T$, $T_1$ etc. are considered applicable.

The position of fifth-time-around signals on the time axis is obtained by decreasing the travel time $t$ by four successive interpulse periods, e.g., $T_1$, $T_2 + \Delta T$, $T_3$, $T_1 + \Delta T$, the result being a reduction of the travel time $t$ by a constant $C'$, which is equal to the sum of all interpulse periods, decreased however by the two interpulse periods not yet referred to, i.e., $T_2$, $T_3 + \Delta T$. Thus, in this case, the position of a fifth-time-around signal on the time axis is characterised by: $t - C' + T_2 + T_3 + \Delta T$. As in the case of TT signals, where the position on the time axis was obtained by applying a correction of two interpulse periods of the travel time $t$, it follows that fifth-time-around signals cannot be suppressed either.

The position of a sixth-time-around signal on the time axis is obtained by decreasing the travel time by five interpulse periods, e.g., $T_1$, $T_2 + \Delta T$, $T_3$, $T_1 + \Delta T$, $T_2$, and hence by $C' - (T_3 + \Delta T)$. Consequently, a sixth-time-around signal is in the same situation as an ST signal, and the sixth-time-around signal will be suppressed on the PPI 14.

In general, it may be demonstrated in an analogous way that only $2n$ th-time-around signals ($n = 1, 2, 3$, etc.) can be suppressed, provided and sequence of interpulse periods are employed. This thus infers an impairment in the suppression of multiple-time-around signals, as compared with the results obtained when using four interpulse periods.

When applying a pulse radar apparatus in which transmitter pulses with more than six interpulse periods are generated, the results to be expected are similar to those derived for a pulse radar apparatus employing six interpulse periods.

Finally, it should be noted that with the detection of multiple-time-around signals shown as dots on the PPI by a pulse radar apparatus of the kind in question. The position on the time axis will vary as the number of interpulse periods with which the transmitter pulses are generated by this pulse radar apparatus. Consequently, said criterion of the comparator 20 will be met to a less extent, thus enhancing the suppression of the latter multiple-time-around signals. When contemplating only the suppression of these multiple-time-around signals, a pulse radar apparatus as described with reference to FIG. 3, may already suffice; however, here the comparator 20' and the elimination circuit 7 are omitted, and the PPI 14 is therefore connected directly to the comparator 20. In this case it is preferred to use a pulse radar apparatus suitable for the generation of transmitter pulses with interpulse periods which can vary arbitrarily between two extreme values in accordance with a pattern that is repeated after some tens of interpulse periods. Besides, there is the added advantage that, when applying the cancel procedure of fixed echoes, hardly any blind speeds will occur.

What we claim is:

1. Pulse radar apparatus comprising a transmitter capable to generate a train of transmitter pulses with at least a double stagger of interpulse periods, a receiver, and means with the aid of which video signals of multiple-time-around target echoes are eliminated from a plan position indicator (PPI), wherein said means comprise at least a (first) combination of a quantizer and a digital memory, and also an elimination circuit, the digital memory containing at least one active memory part and a combination circuit, which is fed, directly as well as via said memory part, with the sequential video signals supplied via the quantizer, whereby the memory part is operative only for a fixed duration, which starts from the moment a transmitter pulse is generated and which is maximally equal to the smallest interpulse period employed, and which memory part imposes upon each quantized video signal supplied, in addition to a delay corresponding with said first duration, a delay which is due to an inoperative state of said memory part, said state occurring during said fixed duration, and whereby the elimination circuit is provided with a delay element, a correlator and a gate circuit, where the video signals, being fed from the digital memory to the elimination circuit, are applied to the delay element and also to the correlator which, on the receipt of each two video signals succeeding each other with an interval equal to the smallest possible time difference between the interpulse periods employed, causes that the gate circuit blocks the access to the PPI for the corresponding video signals supplied via the delay element.

2. Pulse radar apparatus as claimed in claim 1, wherein the correlator is provided with two series-connected delay elements, each of which having a delay time equal to the smallest possible time difference between the interpulse periods being employed, whereby each of said delay elements is bridged by an AND gate, and whereby the output signals of said AND gates control said gate circuit via a common OR gate.

3. Pulse radar apparatus as claimed in claim 1 wherein the digital memory is designed as a delay line integrator, which comprises a number of series-connected active memory parts of the kind already set forth and wherein two comparators are provided between the digital memory and the elimination circuit, whereby said correlator and said delay element are connected separately to said comparators, the comparator connected to the correlator having a threshold level that is maximally equal to the threshold level of the comparator connected to the delay element, and whereby the quantizer generates a standardized video pulse for each applied video signal exceeding a certain theshold level, which standardized video pulse is fed, directly as well as with a delay imposed by at least one of the memory parts of the delay-line integrator, to the corresponding combination circuit, the output signal of which being applied to the two comparators.

4. Pulse radar apparatus as claimed in claim 1, wherein a second combination of an additional quantizer and an additional digital memory is provided between the receiver and said first combination, whereby the additional quantizer is designed as an analogue-to-digital converter and the additional digital memory as a double canceller, and wherein the first combination is connected to the second combination by means of a digital-to-analogue converter.

5. Pulse radar apparatus as claimed in claim 1, whereby the transmitter is capable to generate a train of transmitter pulses with an even number of staggered interpulse periods, said interpulse periods being grouped in pairs such that between each two periods thus grouped and smallest time difference is obtained.

6. Pulse radar apparatus as claimed in claim 5, whereby the transmitter is capable to generate a train of transmitter pulses with four-stagger interpulse periods, each three sequential interpulse periods containing two grouped interpulse periods between which an interpulse period of the other pair is situated.

* * * * *